United States Patent [19]

Miyakawa

[11] 4,349,600

[45] Sep. 14, 1982

[54] COLOR DEVELOPER FOR LEUCO PIGMENT AND RECORDING MATERIAL COMPRISING SAME

[75] Inventor: Nobuhiro Miyakawa, Suita, Japan

[73] Assignee: Mita Industrial Co., Ltd., Osaka, Japan

[21] Appl. No.: 201,591

[22] Filed: Oct. 28, 1980

[30] Foreign Application Priority Data

Nov. 19, 1979 [JP] Japan .................................. 54-14899

[51] Int. Cl.[3] .................................................. B32B 3/26

[52] U.S. Cl. .................................. 428/320.8; 428/341; 428/511; 430/106.6; 430/109; 430/964

[58] Field of Search ............ 430/109, 467, 964, 106.6; 526/313; 282/27.5; 428/913, 341, 320.8

[56] References Cited

U.S. PATENT DOCUMENTS

| | | | |
|---|---|---|---|
| 3,669,658 | 6/1972 | Yonezawa et al. | 430/191 |
| 3,869,292 | 3/1975 | Peters | 430/192 |
| 4,028,340 | 6/1977 | Kanezaki | 526/313 |
| 4,076,887 | 2/1978 | Tsuji et al. | 282/27.5 |
| 4,147,645 | 4/1979 | Lu | 430/109 |
| 4,168,845 | 9/1979 | Oeda et al. | 430/964 |

*Primary Examiner*—J. Travis Brown

*Attorney, Agent, or Firm*—Sherman & Shalloway

[57] ABSTRACT

Disclosed is a color developer for a leuco pigment, which comprises an oligomer or polymer of a vinyl phenol. When this color developer is used for developing the color of a leuco pigment, a color having a high density is developed even if the leuco pigment concentration is low.

4 Claims, 1 Drawing Figure

COLOR DEVELOPER FOR LEUCO PIGMENT AND RECORDING MATERIAL COMPRISING SAME

BACKGROUND OF THE INVENTION (1) Field of the Invention

The present invention relates to a color developer for a leuco pigment. More particularly, the present invention relates to a color developer for a leuco pigment, which comprises an oligomer or polymer of a vinyl phenol. Furthermore, the present invention relates to the use of an oligomer or polymer of a vinyl phenol as a color developer for a leuco pigment in a thermosensitive recording material, an electrostatic photographic recording material or the like.

(2) Description of the Prior Art

Compositions comprising a leuco pigment and a color developer composed of an acidic substance have heretofore been used widely for various methods of recording information, for example, thermosensitive recording, pressure-sensitive recording and electrostatic photographic recording. For example, a recording material comprising a recording layer formed on an appropriate substrate by dispersing a leuco pigment which is colorless or has a light color in the normal state and a phenol which is solid at normal temperatures but fusible under heating into a polymeric binder to form independent dispersed phases of the leuco pigment and the phenol, has been used as a recording element for thermosensitive recording.

However, known phenol type color developers for leuco pigments are insufficient and defective in some points. For example, when the total amount coated of the leuco pigment and the phenol type color developer is constant, in order to obtain a recorded image having a certain density, it is necessary to use the expensive leuco pigment in a considerably larger proportion. Accordingly, the cost of a recording material, for example, the above-mentioned thermosensitive recording element, is increased and fogging is readily caused in the thermosensitive recording element.

It is known that among these known phenol type color developers, some phenols, for example, bis-2,2-(4-hydroxyphenyl)propane, have a reduced tendency to cause fogging. However, these phenols have a relatively high melting point, and therefore, they are still unsatisfactory in that a high temperature heat source is necessary for effecting the thermosensitive recording.

SUMMARY OF THE INVENTION

Research was conducted with a view to overcome these defects involved in conventional color developers for leuco pigments, and it was found that an oligomer or polymer of a vinyl phenol can be an excellent color developer for a leuco dye and that when this oligomer or polymer is used, even if it is used at a concentration much lower than the concentrations customarily adopted for the known color developers for leuco pigments, recorded images having a higher density can be obtained. The present invention is based on this finding.

More specifically, in accordance with the present invention, there is provided a color developer for a leuco pigment, which comprises an oligomer or polymer of a vinyl phenol.

BRIEF DESCRIPTION OF THE DRAWINGS

The FIGURE is a graph showing the relation between the average molecular weight of an oligomer or polymer of p-vinyl phenol and the melting or softening point of the oligomer or polymer.

DETAILED DESCRIPTION OF THE PREFERRED EMBODIMENTS

Figure 1:
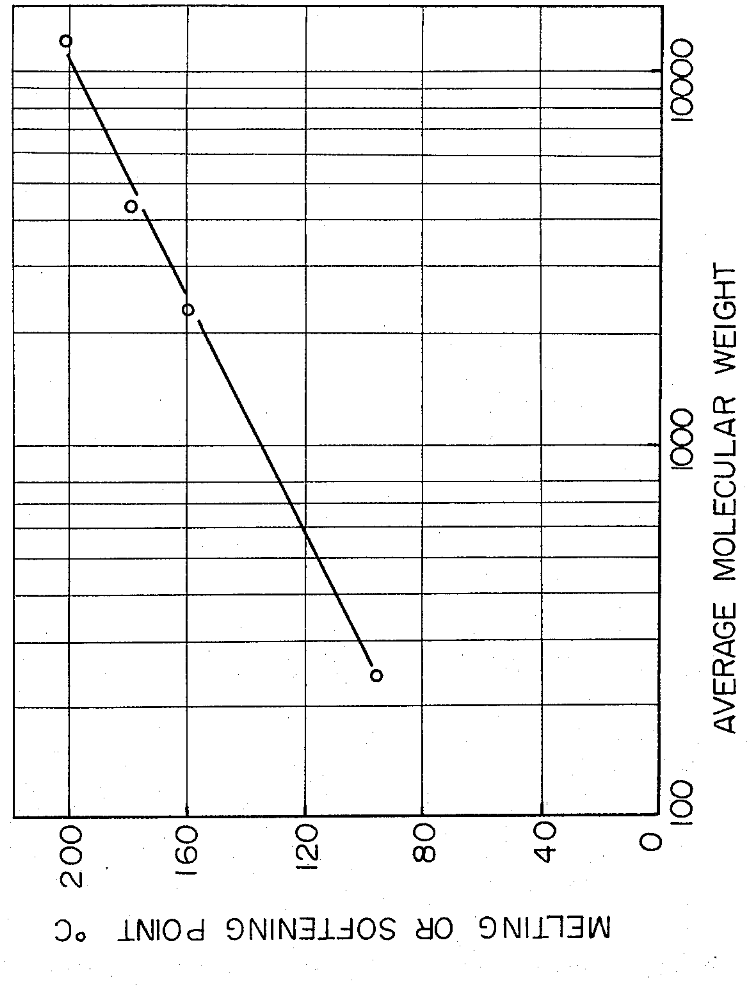

The oligomer or polymer of a vinyl phenol that is used in the present invention is a known substance which is obtained by dehydrogenating ethylphenol in the presence of a catalyst composed of an oxide of iron, magnesium, copper, zinc or chromium, thermally polymerizing the resulting phenol at a temperature of, for example, 100° to 140° C., and, if necessary, purifying the resulting oligomer or polymer.

The vinyl phenol is represented by the following general formula:

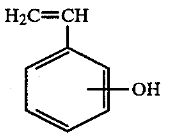

and it is ordinarily preferred that in the above formula, the hydroxyl group be bonded to the benzene nucleus at the para-position to the vinyl group.

This vinyl phenol oligomer or polymer is different from ordinary phenolic resins in the point where it has a substantially linear structure composed of addition-polymerized vinyl phenol units, and the weight average molecular weight ($\overline{M}w$) can be calculated from the intrinsic viscosity $[\eta]$ as measured at 30° C. in tetrahydrofuran according to the following formula:

$$[\eta]=3.45\times10^{-4}\times\overline{M}w^{0.6}$$

Vinyl phenol oligomers and polymers ranging from dimers to polymers having a considerably high molecular weight can be used in the present invention, but it is ordinarily preferred that oligomers or polymers having an average molecular weight of about 242 to about 24,000 be used.

The phenol rings of the vinyl phenol oligomer or polymer may be substituted by 1 or 2 of halogen atoms, especially chlorine or bromine atoms, per phenol ring according to need.

In these vinyl phenol oligomers and polymers, the melting point is elevated with increase of the molecular weight, and the melting point or softening point of the oligomer or polymer that is preferably used in the present invention is ordinarily in the range of from about 95° C. to about 220° C. It will readily be understood that the sensitive temperature of a thermosensitive recording element can freely be adjusted in a considerably broad range by controlling the molecular weight of the vinyl phenol oligomer or phenol.

The vinyl phenol oligomer or polymer that is used in the present invention is a white or light-orange color powder in normal states. Accordingly, the vinyl phenol oligomer or polymer is advantageous in that when it is used as the color developer, the background is hardly colored by the inherent hue of the color developer.

The vinyl phenol oligomer or polymer that is used in the present invention is water-insoluble but soluble in alcohols such as methanols, cellosolve type solvents such as butylcellosolve, ketones such as methylethyl ketone and ester type solvents such as ethyl acetate. Furthermore, the oligomer or polymer is heat-fusible. Accordingly, the oligomer or phenol can easily be used for the preparation of recording materials for use in thermosensitive recording, pressure-sensitive recording and electrostatic photographic recording.

In preparing a thermosensitive recording element, the above-mentioned vinyl phenol oligomer or polymer and a leuco pigment are independently dispersed in a water-soluble or water-dispersible inactive polymeric binder to form a recording layer on a substrate. As the water-soluble or water-dispersible binder, there can be mentioned, for example, polyvinyl alcohol, starch, carboxymethyl starch, hydroxyethyl starch, carboxymethyl cellulose, ethyl cellulose, gum arabic, gelatin, casein, polyvinyl pyrrolidone, polyacrylamide, styrene-maleic acid salt copolymer, vinyl ether-maleic acid salt copolymer and styrene-butadiene copolymer latex. If the vinyl phenol oligomer or polymer is wet-pulverized in an aqueous solution of a resin such as mentioned above by using a ball mill or the like, there is obtained a finely divided dispersion.

The vinyl phenol oligomer or polymer that is used in the present invention is also characterized in that it is relatively brittle and is excellent in the adaptability to the pulverizing operation.

All of the leuco pigments that have been used for thermosensitive recording papers of this type can be used in the present invention. For example, there can be used triphenylmethane leuco pigments, fluoran type leuco pigments, spiropyran type leuco pigments, Rhodamine lactam type leuco pigments, Auramine type leuco pigments and phenothiazine type leuco pigments and mixtures thereof. Preferred examples are as follows.

Triphenylmethane type leuco pigments 3,3-Bis-(p-dimethylaminophenyl)phthalide, 3,3-bis-(p-dimethylaminophenyl)-6-dimethylaminophthalide, 3,3-bis-(p-dimethylaminophenyl)-6-methoxyphthalide, 4-hydroxy-4'-dimethylaminotriphenylmethane lactone and 4,4'-bis-dihydroxy-3,3'-bis-diaminotriphenylmethane lactone.

Fluoran type leuco pigments

3-Dimethylamino-5,7-dimethylfluoran, 3-diethylamino-5,7-dimethylfluoran, 3-diethylamino-6,7-dimethylfuoran, 3-cyclohexylamino-6-methoxyfluoran, 3,6-bis-β-methoxyethoxyfluoran, 3-diethylamino-7-dibenzylaminofluoran, 3-diethylamino-6-methyl-7-chlorofluoran, 3-diethylamino-6-methyl-7-anilinofluoran, 3,7-bis-diethylaminofluoran and 3-diethylamino-7-methoxyfluoran.

Spiropyran type leuco pigments

8'-Methoxybenzoindolinospiropyran, 3-phenyl-8'-methoxybenzoindolinospiropyran, 6'-chloro-8'-methoxybenzoindolinospiropyran, 5,6'-dichloro-8'-methoxybenzoindolinospiropyran, 4,7,8'-trimethoxybenzoindolinospiropyran, benzo-β-naphthospiropyran, 3-methyl-di-β-naphthospiropyran and 1,3,3-trimethyl-6'-chloro-8'-methoxyindolinobenzospiropyran.

Rhodamine lactam type leuco pigments 9-(p-Nitroanilino)-3,6-bis-(diethylamino)-9-xanthyl-o-benzoic acid lactam and 2-[3,6-bis-(diethylamino)-9-(o-chloroanilino)xanthyl]benzoic acid lactam.

Auramine type leuco pigment 2,5-Dichloro-N-phenylleuco-Auramine, 4,4'-bis-dimethylamino-3,4-chlorophenylleuco-Auramine and 4,4'-bis-dimethylaminopiperazine-Hydrol.

Phenothiazine type leuco pigment

Benzoyl-Leucomethylene Blue, p-chlorobenzoyl-Leucomethylene Blue, 3,4-dichlorobenzoyl-Leucomethylene Blue and p-methoxybenzoyl-Leucomethylene Blue.

A dispersion of a leuco pigment such as mentioned above can easily be obtained by wet-pulverizing the pigment in an aqueous solution of a water-soluble or water-dispersible binder. A composition for formation of a thermosensitive recording layer is obtained by mixing the so formed dispersion with the above-mentioned dispersion of the vinyl phenol oligomer or polymer.

As pointed out hereinbefore, the color developer of the present invention provides a recorded image having a high density even if the concentration of the leuco pigment is low. In the present invention, it is preferred that the weight ratio of the leuco pigment to the vinyl phenol oligomer or polymer be in the range of from 1/5 to 1/40, especially from 1/10 to 1/20.

Furthermore, it is preferred that the binder be used in an amount of 20 to 65% by weight, especially 25 to 50% by weight, based on the total amount of the leuco pigment and color developer.

Known additives may be incorporated in known amounts so as to improve various properties of the thermosensitive recording layer. For example, a white pigment such as titanium oxide may be added to improve the whiteness of the recording layer or as the extender, or a filler such as clay or calcium carbonate may be added for the same purpose. Furthermore, in order to adjust the recording sensitivity, there may be added animal, vegetable and mineral waxes such as paraffin wax and carnauba wax, higher fatty acids and their derivatives such as stearic acid, soaps and fatty acid amides, and synthetic waxes such as polyethylene wax, polypropylene wax and polyethylene glycol. Moreover, in order to inhibit coloration of the background, there may be used alkanol amines such as triethanol amine and other organic bases. Still further, there may be incorporated water resistance-imparting agents and defoaming agents according to need.

As the substrate on which the recording layer is formed, there can be used, for example, papers, non-woven fabrics, synthetic papers, films, metal foils and laminates thereof. It is preferred that the recording layer be formed in an amount coated of 2 to 10 $g/m^2$, especially 3 to 8 $g/m^2$, on a dry basis.

The thermosensitive recording element of the present invention is valuable as a recording element in the facsimile, printer, data communication, computer terminal, measuring device, passometer or copying machine using a thermal head, thermal pen, infrared flash lamp or laser as the heat source.

The color developer can be used for not only the abovementioned thermosensitive recording element but also a pressure-sensitive recording element. More specifically, since the vinyl phenol oligomer or polymer by itself has a function as the binder, it can easily be coated on a substrate such as paper and an underlying sheet of a pressure-sensitive recording element can be thus prepared. Of course, also in this case, the oligomer or polymer may be finely divided and dispersed in a medium of a water-soluble or water-dispersible inactive polymeric binder and be used for formation of a pressure-sensitive color developer layer. Furthermore, the oligomer or polymer may be used as the binder and be combined with a known solid acid color developer.

Moreover, since the color developer of the present invention is heat-fusible and has a property of being charged under application of electricity or by friction, it can be used in the field of electrostatic photographic recording. More specifically, when a dry powder of the vinyl phenol oligomer or polymer is mixed with a magnetic carrier, the powder is negatively charged. Accordingly, if a positive electrostatic latent image on an electrostatic photographic light-sensitive plate is developed with magnetic brushes of a two-component type developer comprising the vinyl phenol oligomer or polymer and a known magnetic carrier by known means, a powder image of the oligomer or polymer is formed on the light-sensitive plate. If this powder image is transferred onto a transfer sheet having a layer of a leuco pigment and the transferred powder image is then heated, a very excellent image can be formed by the reaction between the oligomer or polymer and the leuco pigment.

The present invention will now be described with reference to the following Examples that by no means limit the scope of the invention.

EXAMPLE 1 p-Vinyl phenol was polymerized to form a dimer and polymers having average molecular weights of 2300, 4300 and 12,000, and their melting points (the softening point in case of the polymer having an average molecular weight of 12,000) were examined by using, as the melting point measuring device, Micro Melting Point Apparatus Model No. 428 (manufactured by Shibayama Seisakusho). The relation between the melting point (softening point) and the average molecular weight, thus observed, is shown in FIG. 1.

From FIG. 1, it is seen that in the color developer of the present invention, the melting point can be chosen within a broad range of from about 95° to about 200° C. and it is one of advantages of the present invention that the sensitive temperature of a thermosensitive recording paper can be changed and adjusted by controlling the average molecular weight of the color developer.

EXAMPLE 2

In a ball mill, 100 parts by weight (all of "parts" given hereinafter being by weight) of a dimer of p-vinyl phenol (having a melting point of 95° to 96° C.) was pulverized in 670 parts of a 5% by weight aqueous solution of polyvinyl alcohol and 100 parts of water for 20 hours to form a liquid A.

In a ball mill, 50 parts of Crystal Violet lactone was pulverized in 330 parts of a 5% by weight aqueous solution of polyvinyl alcohol and 50 parts of water for 20 hours to form a liquid B.

For comparison, 100 parts of bisphenol A (having a melting point of 156° C.) was pulverized in the same manner as adopted above for formation of the liquid A, to form a liquid A'.

Coating compositions were prepared by mixing the two dispersions so that the amount of the phenol type color developer was 5, 10, 20 or 40 times the amount of Crystal Violet lactone. The coating compositions were independently coated on high quality papers having a basis weight of 55 $g/m^2$ by a wire bar so that the amount coated of each composition was 5 $g/m^2$ on the dry basis, and the coated compositions were dried at 60° C., whereby thermosensitive recording papers were prepared. The recording papers were passed through between rotating heater rollers (hot rollers having a pressing force of 1 Kg/cm) at a speed of 4 cm/sec to develop the color of the leuco pigment. Color development was carried out at various temperatures. In each run, the reflection density of the developed color was measured by using a color densitometer, Macbeth RD-514 (a red filter was used). The obtained results are shown in Table 1.

TABLE 1

| Color Developer | Heating Temperature (°C.) | Reflection Density Crystal Violet Lactone/ Phenol Type Color Developer Mixing Ratio 1/5 | 1/10 | 1/20 | 1/40 |
|---|---|---|---|---|---|
| p-vinyl phenol dimer (present invention) | 90 | 0.27 | 0.20 | 0.18 | 0.15 |
| p-vinyl phenol dimer (present invention) | 100 | 0.97 | 0.90 | 0.61 | 0.61 |
| p-vinyl phenol dimer (present invention) | 110 | 1.33 | 1.19 | 0.93 | 0.85 |
| p-vinyl phenol dimer (present invention) | 120 | 1.39 | 1.28 | 1.11 | 0.96 |
| p-vinyl phenol dimer (present invention) | 130 | 1.45 | 1.37 | 1.23 | 1.04 |
| p-vinyl phenol dimer (present invention) | 140 | — | — | — | — |
| p-vinyl phenol dimer (present invention) | 150 | 1.42 | 1.38 | 1.25 | 1.08 |
| bisphenol A (comparison) | 90 | — | — | — | — |
| bisphenol A (comparison) | 100 | 0.10 | 0.10 | 0.09 | 0.09 |
| bisphenol A (comparison) | 110 | 0.12 | 0.10 | 0.09 | 0.09 |
| bisphenol A (comparison) | 120 | 0.14 | 0.12 | 0.11 | 0.10 |
| bisphenol A (comparison) | 130 | 0.47 | 0.36 | 0.29 | 0.17 |
| bisphenol A (comparison) | 140 | — | — | — | — |
| bisphenol A (comparison) | 150 | 1.21 | 1.04 | 0.98 | 0.44 |

From the results shown in Table 1, it will readily be understood that the optimum leuco pigment/phenol type color developer is 1/5 in case of bisphenol A while this optimum ratio is 1/20 in case of the p-vinyl phenol dimer, and that the color developer of the present invention is therefore advantageous in that the amount used of the expensive leuco pigment can be reduced.

EXAMPLE 3

In a ball mill, 100 parts of a p-vinyl phenol polymer having an average molecular weight of 2300 was pulverized and mixed with 10 parts of Kao Wax #230 (special esterified wax having a melting point of 80° C.; a product of Kao Sekken K. K.) for 20 hours in 735 parts of a 5% by weight aqueous solution of etherified starch (Pio-Starch CM manufactured by Nichiden Kagaku K. K.) and 110 parts of water to form a liquid A.

In a ball mill, 50 parts of Malachite Green lactone was pulverized for 20 hours in 330 parts of a 5% by weight aqueous solution of the above-mentioned etherified starch and 50 parts of water to form a liquid B1. A liquid B2 was prepared in the same manner by using 50 parts of Rhodamine lactam instead of Malachite Green lactone.

Then, 3.6 parts of the liquid B1 or B2 was added to 20 parts of liquid A, and the mixture was sufficiently stirred to form a coating composition.

The coating composition was coated and dried in the same manner as in Example 2 to form a thermosensitive recording paper. The recording paper was passed at a speed of 4 cm/sec through between heater rollers maintained at 140° C. to effect color development.

In this case, the density of the developed color was 0.82 (green filter) or 0.70 (visible filter).

EXAMPLE 4

In a ball mill, 50 parts of 3-dimethylamino-6-methyl-7-anilinofluoran was pulverized in 330 parts of a 5% by weight aqueous solution of polyacrylamide and 50 parts of water in the same manner as in the preceding Examples, and 5 parts of the so formed dispersion was added to liquid A prepared in Example 2 and the mixture was sufficiently stirred to form a coating composition. The coating composition was coated and dried in the same manner as in the preceding Examples to form a thermosensitive recording paper. The recording paper was passed at a speed of 4 cm/sec between heater rollers maintained at 100° C. A black color having a reflection density of 1.02 (a visible filter was used) was developed.

EXAMPLE 5

A developer was prepared by mixing 50 parts of fine particles (having a particle size of 20 to 50μ) of a p-vinyl phenol polymer (having an average molecular weight of 4300) with 950 parts of iron powder (EFV 200/300 manufactured by Nippon Teppun K. K.). The surface of a photosensitive plate comprising a photosensitive layer of polyvinyl carbazole/2,4,7-trinitrofluorenone (molar ratio=1/0.4) having a thickness of 12μ and formed on an aluminum foil (having a thickness of 100μ) was positively charged at +6 KV in the dark by corona discharge, and the photosensitive plate was exposed imagewise through a positive original according to customary electrophotographic operations. Then, magnetic brush development was carried out by using the above-mentioned developer, and the developed image was transferred by corona discharge onto a transfer sheet formed by dipping a high quality paper (having a basis weight of 55 $g/m^2$) in a 0.5% by weight tetrahydrofuran solution of Crystal Violet lactone and a transfer sheet formed by coating a high quality paper (having a basis weight of 55 $g/m^2$) with the leuco pigment dispersion prepared in Example 4. After the transfer operations, the transfer sheets were passed at a speed of 2 cm/sec through heater rollers maintained at 185° C.

Clear and sharp positive images having a blue color and a black color, respectively, were obtained. The p-vinyl phenol polymer used as the toner was charged negatively, and fogging was not observed at all.

EXAMPLE 6

A high quality paper was dipped in a 1% by weight methanol solution of a p-vinyl phenol polymer (having an average molecular weight of 12,000) or a brominated p-vinyl phenol polymer (having an average molecular weight of 2400; 3 bromine atoms were added to 2 molecules of the vinyl phenol monomer) and was then dried. The back face of an upper sheet of a commercially available pressure-sensitive paper was super-imposed on the surface of the above high quality paper, and letters were written on the front face of the pressure-sensitive recording paper by a ball pen. A blue transcript was observed on the surface of each high quality paper. Thus, it was confirmed that the color developer of the present invention is valuable as a color developer for pressure-sensitive recording.

What is claimed is:

1. In a thermosensitive recording element which comprises a substrate and a recording layer formed on said substrate, the improvement wherein said recording layer comprises independent dispersed phases of an oligomer or polymer of a vinyl phenol represented by the following formula:

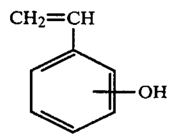

and a leuco pigment which is colorless or has a light color in the normal state and has the ability to form color images upon reacting with said oligomer or polymer in a water-soluble or water-dispersible inactive polymeric binder, said oligomer or polymer having a melting point of softening point of 95° to 220° C. and an average molecular weight of from 242 to 24000, the weight ratio of the leuco pigment to the oligomer or polymer being in the range of from 1/5 to 1/40.

2. A thermosensitive recording element according to claim 1 wherein the weight ratio of the leuco pigment to the oligomer or polymer is in the range of from 1/10 to 1/20.

3. A thermosensitive recording element according to claim 1 wherein the polymeric binder is present in an amount of 20 to 65% by weight based on the total amount of the leuco pigment and the oligomer or polymer.

4. A thermosensitive recording element according to claim 1 wherein the recording layer is formed in an amount coated of 2 to 10 $g/m^2$ on the dry basis.

* * * * *

UNITED STATES PATENT AND TRADEMARK OFFICE

CERTIFICATE OF CORRECTION

PATENT NO. : 4,349,600

DATED : September 14, 1982

INVENTOR(S) : Nobuhiro Miyakawa

It is certified that error appears in the above—identified patent and that said Letters Patent is hereby corrected as shown below:

On the title page, Foreign Application Priority Data should read:

--[30] Foreign Application Priority Data

Nov. 19, 1979 [JP] Japan.........54-148996--.

Signed and Sealed this

*Twentieth* Day of *March 1984*

[SEAL]

*Attest:*

GERALD J. MOSSINGHOFF

*Attesting Officer* *Commissioner of Patents and Trademarks*